(12) United States Patent
Zalewski

(10) Patent No.: US 8,411,050 B2
(45) Date of Patent: Apr. 2, 2013

(54) TOUCH INTERFACE HAVING MICROPHONE TO DETERMINE TOUCH IMPACT STRENGTH

(75) Inventor: Gary M. Zalewski, Oakland, CA (US)

(73) Assignee: Sony Computer Entertainment America, Foster City, CA (US)

( * ) Notice: Subject to any disclaimer, the term of this patent is extended or adjusted under 35 U.S.C. 154(b) by 538 days.

(21) Appl. No.: 12/579,362

(22) Filed: Oct. 14, 2009

(65) Prior Publication Data

US 2011/0084914 A1   Apr. 14, 2011

(51) Int. Cl.
*G08B 6/00* (2006.01)

(52) U.S. Cl. ........................................ 345/173
(58) Field of Classification Search .................. 345/173
See application file for complete search history.

(56) References Cited

U.S. PATENT DOCUMENTS

| 5,764,218 | A | 6/1998 | Della Bona et al. |
| 7,046,230 | B2 | 5/2006 | Zadesky et al. |
| 7,333,092 | B2 | 2/2008 | Zadesky et al. |
| 7,479,949 | B2 | 1/2009 | Jobs et al. |
| 2002/0018051 | A1 | 2/2002 | Singh |
| 2003/0132950 | A1* | 7/2003 | Surucu et al. ................. 345/700 |
| 2006/0097991 | A1* | 5/2006 | Hotelling et al. ............. 345/173 |
| 2007/0137462 | A1 | 6/2007 | Barros et al. |
| 2009/0122024 | A1 | 5/2009 | Nakamura et al. |
| 2009/0163282 | A1* | 6/2009 | Masuda et al. .................. 463/43 |

OTHER PUBLICATIONS

PCT International Search Report and Written Opinion for International Application No. PCT/US2010/37420, mailed Jul. 27, 2010, 9 pages.

* cited by examiner

*Primary Examiner* — Amare Mengistu
*Assistant Examiner* — Shawna Stepp Jones
(74) *Attorney, Agent, or Firm* — Blakely, Sokoloff, Taylor & Zafman LLP

(57) ABSTRACT

A computing device receives position coordinates of a touch input region upon a user touching the touch input region. The computing device also receives an audio signal from an audio sensor upon the user touching the touch input region. An impact strength of the user's touch is determined based on the audio signal. The computing device performs an action that is associated with the determined impact strength.

15 Claims, 15 Drawing Sheets

TOUCH INTERFACE HAVING MICROPHONE TO DETERMINE TOUCH IMPACT STRENGTH

FIELD OF THE INVENTION

The present invention relates generally to touch interfaces, and more specifically to detecting an impact strength of a user touch on a touch interface.

DESCRIPTION OF THE RELATED ART

Numerous different input devices are used to enable users to interact with modern computing devices. One input device frequently used in portable devices is a touchpad (or touchscreen). The touchpad is a user interface device that tracks the motion and position of a user's finger and translates the motion and position to a relative position on a display. Touchpads can be used to perform such functions as positioning a cursor and selecting an item on a display.

Touchpads can be implemented using multiple different sensing technologies. The most common sensing technology senses the capacitance of a finger. However, touch pads that use capacitive sensing cannot differentiate between impact strengths of user touches (including taps). Capacitive sensor touchpads will, for example, register both a strong tap and a weak tap simply as a tap.

Another input device that may be used with computing devices is a virtual keyboard projector. A virtual keyboard projector includes a projector that projects a virtual keyboard onto a surface (typically a flat surface). The virtual keyboard projector also includes a camera that tracks a user's fingers as the user moves his fingers onto projected keys. One problem with a virtual keyboard is that the camera is unable to detect when the finger actually comes into contact with the surface onto which the virtual keyboard is projected. Thus, it can be difficult to detect, for example, repeated selections of the same key.

BRIEF DESCRIPTION OF THE DRAWINGS

The invention may best be understood by reference to the following description taken in conjunction with the accompanying drawings in which.

DETAILED DESCRIPTION

Figure 1A:
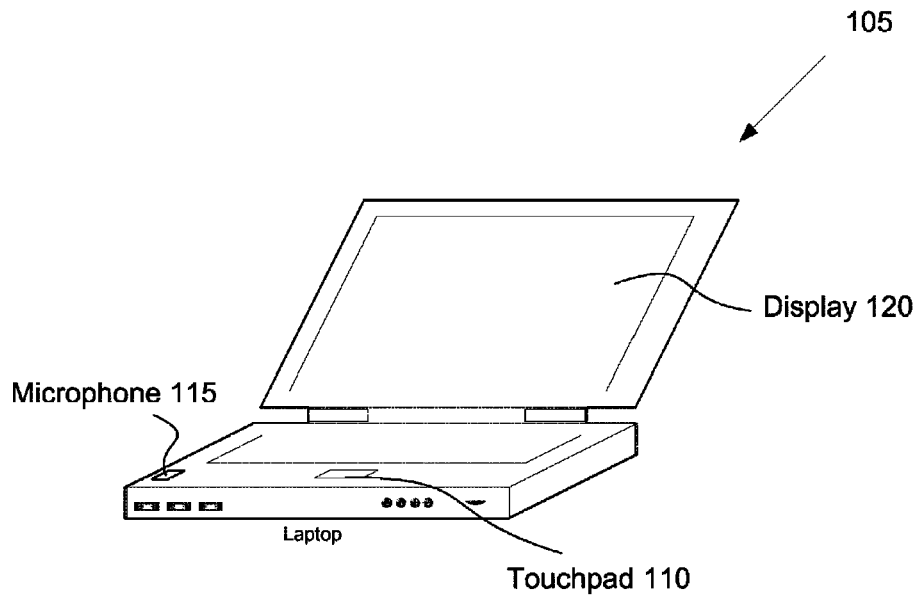
FIG. 1A illustrates a laptop computer that includes a touchpad and a microphone, in accordance with one embodiment of the present invention.

Described herein is a method and apparatus for determining an impact strength of a user touch when the user contacts a touch input region. In one embodiment, an electronic device determines position coordinates of a touch input region upon a user touching the touch input region. The touch input region may be a touchpad, touchscreen, projected keyboard, or other touch input region. The electronic device also receives an audio signal from an audio sensor upon the user touching the touch input region. The electronic device uses the audio signal to determine an impact strength of the user's touch. For example, soft audio signals may be associated with a low impact strength (light tap), while louder audio signals may be associated with high impact strength (hard tap). The electronic device generates a command that is associated with the determined impact strength. A host computing device may then perform one or more actions based on the command. For example, a light tap may cause an icon to be selected, while a hard tap may cause an application associated with the icon to be executed.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

The present invention also relates to an apparatus for performing the operations herein. This apparatus may be specially constructed for the required purposes, or it may comprise a general purpose computing device selectively activated or reconfigured by a computer program stored in the computer. In one embodiment, the apparatus for performing the operations herein includes a mobile game console (e.g., a Sony Playstation Portable®, a Nintendo DS®, etc.). Alternatively, the apparatus may be a laptop computer, keyboard projector, mobile phone, personal digital assistant (PDA), keyboard equipped with a touchpad, touchscreen monitor, etc. Additionally, the apparatus may be an electronic device that is a component of, or otherwise connected with, a host computing device. The host computing device may be a portable game console, laptop computer, PDA, mobile phone, portable music player, etc.

Figure 1B:
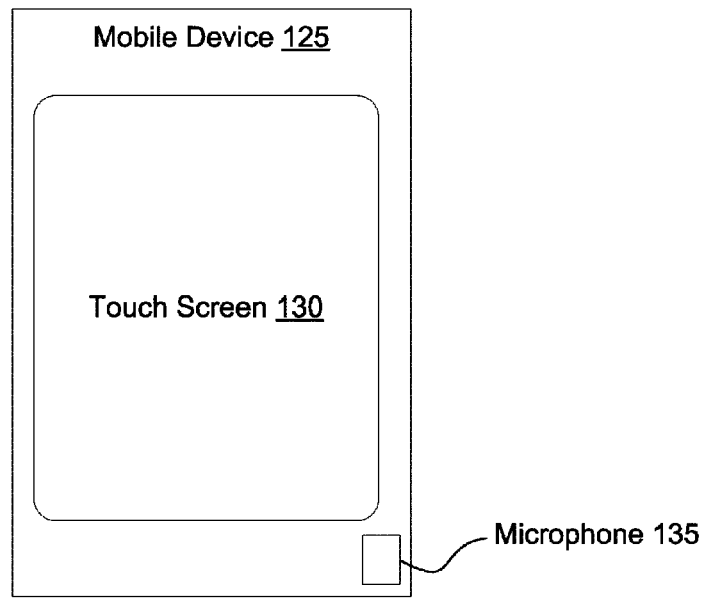
FIG. 1B illustrates a mobile device that includes a touchscreen and a microphone, in accordance with one embodiment of the present invention.
Figure 1C:
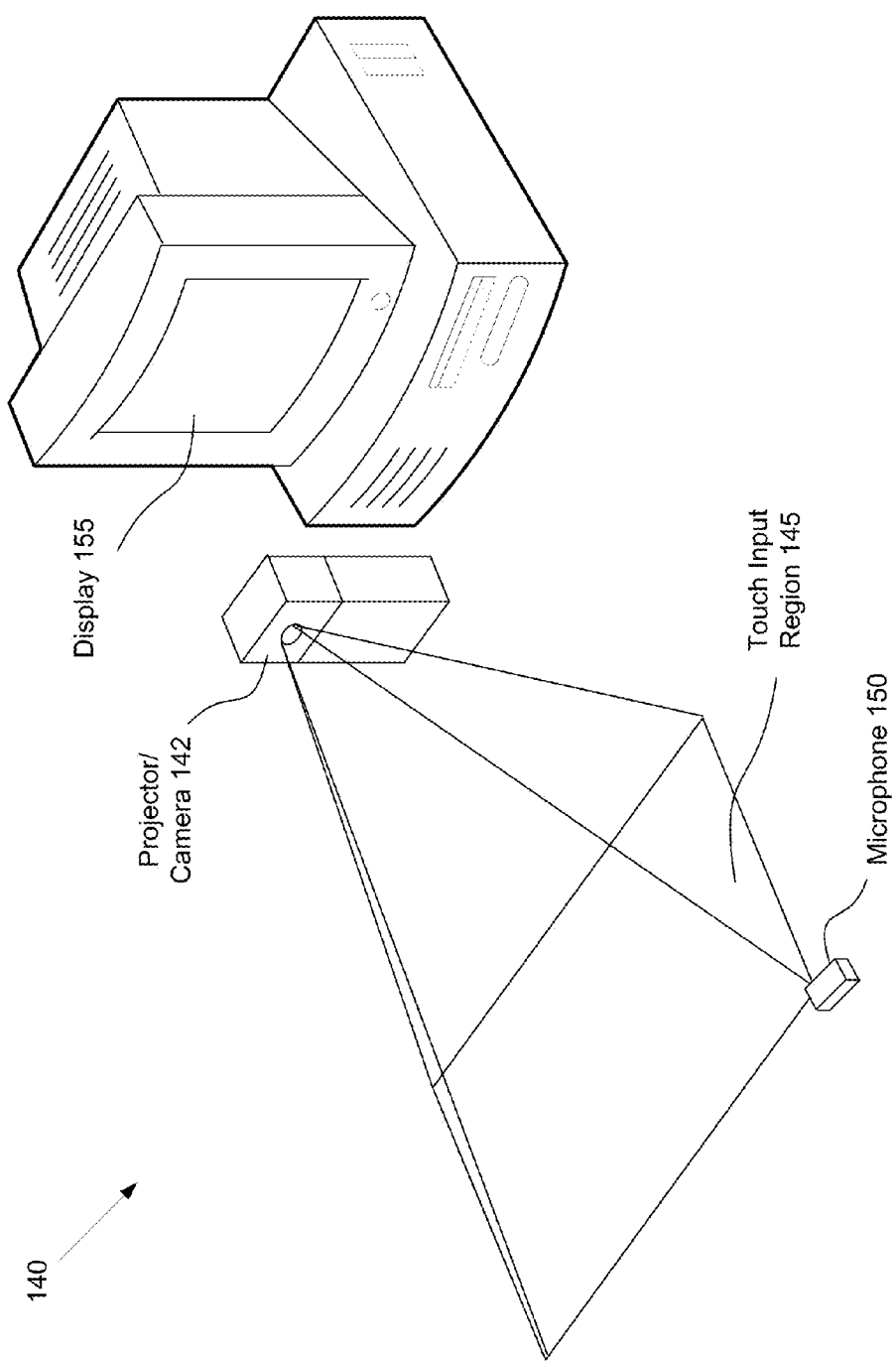
FIG. 1C illustrates a desktop computer including a projector/camera that provides a touch input region, in accordance with one embodiment of the present invention.

FIGS. 1A-1C illustrate three computing devices that include various touch inputs, in accordance with embodiments of the present invention. FIG. 1A illustrates a laptop computer 105 that includes a touchpad 110 and a microphone 115. The touchpad 110 may translate detected finger motions into input control for a cursor displayed in display 120. In one embodiment, the microphone 115 detects sound waves generated when a user taps or otherwise touches the touchpad 110. The laptop computer 105 may determine an impact strength of a user touch based on the detected sound wave, and may perform one or more actions based on the impact strength and/or the location of a pointer within the display 120. For example, if the pointer is positioned over an icon shown in display 120 and a soft tap is detected, the icon may be selected. However, if the pointer is positioned over the icon and a hard tap is detected, an application associated with the icon may be executed.

FIG. 1B illustrates a mobile device 125 that includes a touchscreen 130 and a microphone 135. The mobile device 125 may be a portable game console, mobile phone, PDA, tablet computer, etc. The touchscreen 130 is a display that can detect the location and motion of a finger or other object (e.g., a stylus) on the screen. Unlike a touchpad, the touchscreen 130 enables a user to interact directly with images displayed on the screen. The microphone 135 may detect the impact strength of a user tap on the touchscreen 130. The mobile device 125 may then use the detected impact strength and/or location of the user tap to perform one or more actions.

In one embodiment, the mobile device 215 includes a double sided touchscreen. Accordingly, a back side (not shown) of the mobile device 125 may include an additional touch input region. Additional actions may be performed based on a detected impact strength of a user touch on the back side touch input region.

FIG. 1C illustrates a desktop computer 140 that includes a projector/camera 142 that provides a touch input region 145. The projector/camera 142 can project a virtual keyboard within the touch input region 145 onto a surface. The projector/camera 142 can then detect when a user's finger is moved over a virtual key, and register a key press for the appropriate key. The projector/camera 142 may also project a rectangular touch area in which a user may move his fingers to control a cursor on a display 155 of the desktop computer 140.

One problem with conventional virtual keyboard projectors is that they can only detect finger position. Such conventional virtual keyboard projectors cannot detect the moment that a finger actually touches the surface onto which the virtual keyboard is projected. Accordingly, in one embodiment a microphone 150 is physically attached to or included in the projector/camera 142. Alternatively, the microphone 150 may be detached from the projector/camera 142 and the desktop computer 140, and placed proximate to the touch input region 145. In one embodiment, the microphone is wirelessly connected to the projector/camera 142 (e.g., via Bluetooth, wireless fidelity (WiFi), Zigbee, etc.). In another embodiment, the microphone 150 is connected with the projector/camera 142 via a wired connection, such as a universal serial bus (USB) connection, firewire (IEEE 1394) connection, or other wired connection. Alternatively, the microphone 150 may be connected with the desktop computer 140 via a wired or wireless connection.

When a finger touches the surface onto which the touch input region 145 is projected, a sound wave is generated. The microphone 150 detects this sound wave, and notifies the projector/camera 142 or the desktop computer 140 that a tap event has been detected, which may correspond to a key depression. For example, a key command may not be registered until a user has positioned his finger over a projected key and tapped the touch input region 145 at the location of the projected key.

In one embodiment, the strength of sound waves detected by the microphone 150 is used to determine how hard the user tapped the touch input region 145. Different strength taps may be associated with different commands. For example, a hard tap in the location of a projected key may cause the desktop computer to recognize a lowercase key, while a hard tap in the location of the projected key may cause the desktop computer 140 to recognize a capital letter.

Where the microphone 150 is positioned with relation to the touch input region 145 can affect audio input signals that are picked up by the microphone 150. Accordingly, in one embodiment, a user is requested to place the microphone 150 at a specific location within or adjacent to the touch input region 145. For example, the user may be requested to place the microphone 150 at the lower left hand corner of the touch input region (as shown). Alternatively, or in addition, the user may be requested to perform a brief calibration to calibrate the microphone 150 (or an audio analyzer that analyzes signals received from the microphone). Calibrating the microphone 150 (or audio analyzer) may include performing a single tap at a requested location within the touch input region 145. Alternatively, the user may be requested to perform taps at multiple location within the touch input region 145. Calibrating the microphone (or audio analyzer) is discussed in greater detail below with reference to FIG. 11.

Figure 2A:
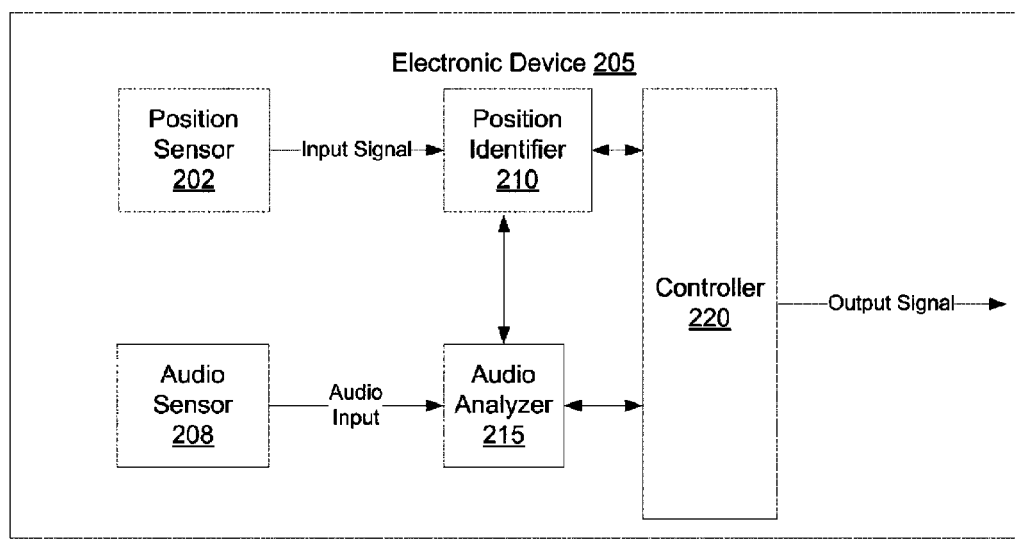
FIG. 2A illustrates an example electronic device that can be used by a host computing device to determine an impact strength of a user touch, in accordance with one embodiment of the present invention.

FIG. 2A illustrates an example electronic device 205 that can be used by a host computing device to determine a user tap strength based on measurements made by an audio sensor (e.g., a microphone), in accordance with one embodiment of the present invention. Examples of host computing devices that the electronic device 205 may be connected with, or components of, include mobile device 105, laptop computer 120 and desktop computer 140. Alternative electronic devices that perform the functions of electronic device 205 may also be implemented in various computing devices to detect impact strength of user touches.

Electronic device 205 includes a position identifier 210 that receives position input signals representative of position coordinates from a position sensor 202. In one embodiment, The position sensor 202 is a touch panel such as a touchpad or touchscreen. The touch panel in one embodiment detects objects (e.g., fingers) by measuring capacitance. Alternatively, the touch panel may be configured to operate through alternate detection principles, such as by using resistive, infrared, surface acoustic wave, electromagnetic, near field imaging, or other technologies. In another embodiment, the position sensor 202 includes a camera (e.g., for a virtual keyboard) that optically tracks position. Other touch based input mechanisms may also be used.

Position identifier 210 receives the input signals when a user places a finger or other object within a touch sensitive input region of the position sensor 202. Position identifier 210 interprets the position input signals to determine position coordinates. The position coordinates are then sent to a controller 220 and/or an audio analyzer 215. The position coordinates may be used, for example, by a host computing device to navigate a user interface.

Figure 3A:
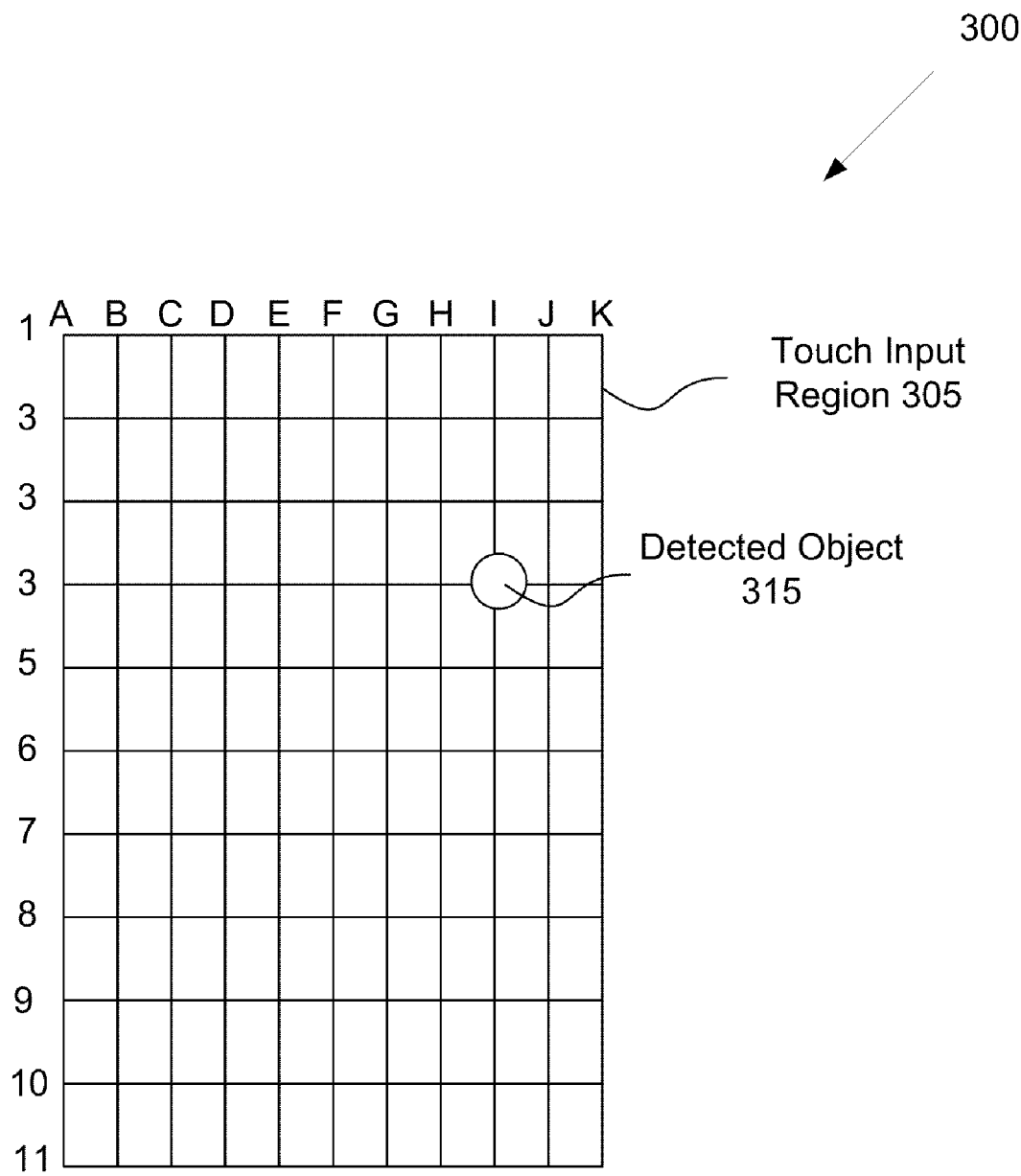
FIG. 3A illustrates an example touch input region that is divided into a grid, in accordance with one embodiment of the present invention.

FIG. 3A illustrates an example touch input region 300 that is divided into a grid, in accordance with one embodiment of the present invention. The touch input region 300 may correspond to the position sensor 202 of FIG. 2A. In one embodiment, the grid represents rows (e.g., rows 1 through 11) and columns (e.g., columns A through K) of an array of capacitive sensor elements in a capacitive touchpad. The capacitance detected by a capacitive sensor changes as a function of the proximity of a conductive object (e.g., a finger) to the sensor. A change in capacitance detected by each sensor of the sensor array due to the proximity or movement of a conductive object can be measured. The capacitive sensor elements may be configured to measure capacitance using various techniques, such as with a relaxation oscillator, a current verses voltage phase shift comparison, resistor-capacitor charge timing, a capacitive bridge divider, charge transfer, sigma-delta modulators, charge-accumulation circuits, or the like.

An approximately exact position of the detected object 315 (e.g., a finger) may be determined by identifying which of the sensor elements along the columns and which of the sensor elements along the rows detect the conductive object. This information may be used to determine position coordinates.

Referring back to FIG. 2A, in one embodiment, the position identifier 210 is configured to compete an impact strength of a user touch. Position sensor 202 can measure the size of objects contacting the touch input region. When a user taps the touch input region with a finger, multiple different object sizes may be detected in a brief time span. When the user's finger initially impacts the touch input region, a tip of the finger may be detected, which may register as a relatively small circle. Momentarily thereafter, once the finger is fully pressed against the touch input region, the user's touch may register as a larger circle or ellipse.

In one embodiment, position identifier 210 includes a lower contact threshold and an upper contact threshold. The lower contact threshold may be satisfied when an object having the shape and/or size of the tip of a user's finger is detected. The upper contact threshold may be satisfied when an object having the size and/or shape of a user's finger fully pressed against the touch input region is detected. The position identifier 210 may record times when the lower contact threshold is satisfied and when the upper contact threshold is satisfied. The position identifier 210 may then determine an impact strength of the user's touch based on the elapsed time between when the lower contact threshold is satisfied and when the upper contact threshold is satisfied. Elapsed time thresholds may be used to distinguish between, for example, high impact touches, medium impact touches and low impact touches. Position identifier 210 may report the impact strength to the controller 220.

Figure 3B:
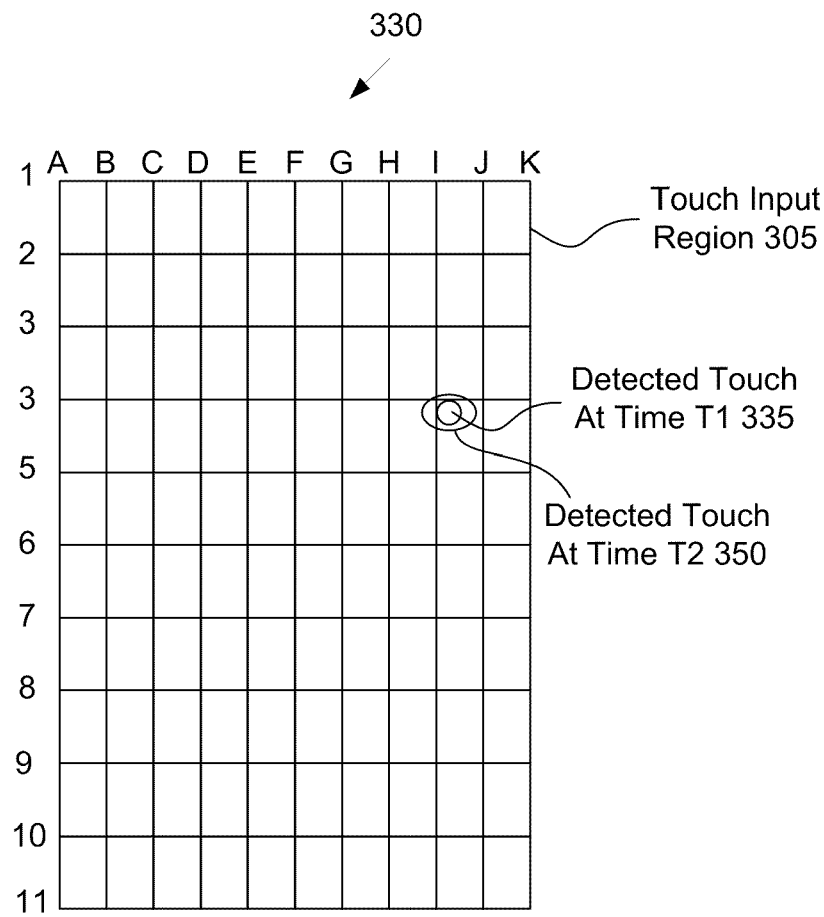
FIG. 3B illustrates the example touch input region shown in FIG. 3A, at two points in time, in accordance with one embodiment of the present invention.

FIG. 3B illustrates the example touch input region 305 shown in FIG. 3A, at two points in time. At the first point in time T1, the tip of a user's finger is detected 335 the instant the user touches the touch input region 305. At a second point in time T2, the user's finger fully pressed against the touch input region 305 is detected 350. The time that elapses between time T1 and time T2 in one embodiment is used to determine the touch impact strength.

Figure 3C:
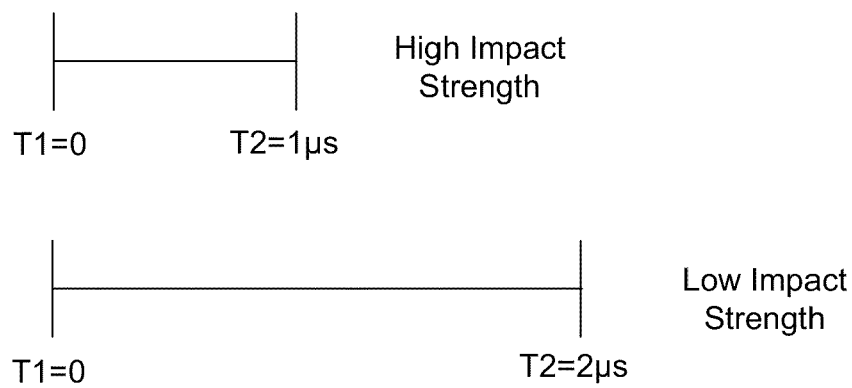
FIG. 3C illustrates example time spans between when a touch is first detected and when it is fully detected for user touch having a high impact strength and a user touch having a low impact strength, in accordance with one embodiment of the present invention.

FIG. 3C illustrates example time spans between when a touch is first detected (T1) and when it is fully detected (T2) for a user touch having a high impact strength and a user touch having a low impact strength. As shown, a shorter time span (e.g., 1 microseconds) is indicative of a high impact strength, while a longer time span (e.g., 2 microseconds) is indicative of low impact strength.

Returning to FIG. 2A, electronic device 205 includes an audio analyzer 215 that receives and analyzes audio input signals from an audio sensor 208 (e.g., a microphone). Audio analyzer 215 determines whether a received audio signal matches an audio profile of a user tap. In one embodiment, audio analyzer 215 is configured to distinguish between audio signals generated by user taps and other audio signals. In a further embodiment, audio analyzer 215 is configured to differentiate between user taps having different impact strengths.

Figure 4A:
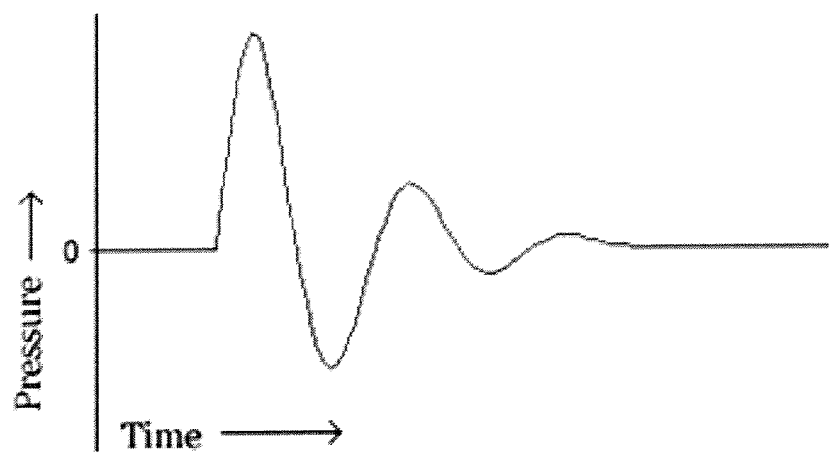
FIG. 4A illustrates a sound wave generated when a user taps a touch input region with a high impact tap, in accordance with one embodiment of the present invention.
Figure 4B:
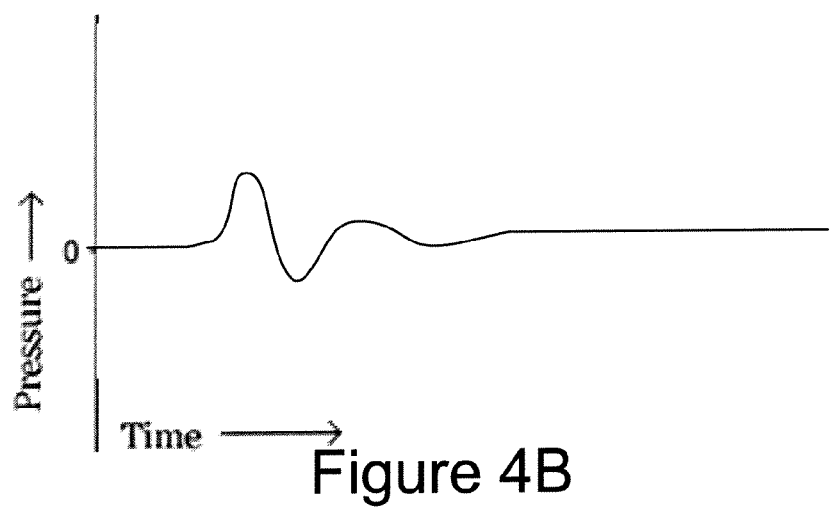
FIG. 4B illustrates a sound wave generated when a user taps a touch input region with a medium impact tap, in accordance with one embodiment of the present invention.
Figure 4C:
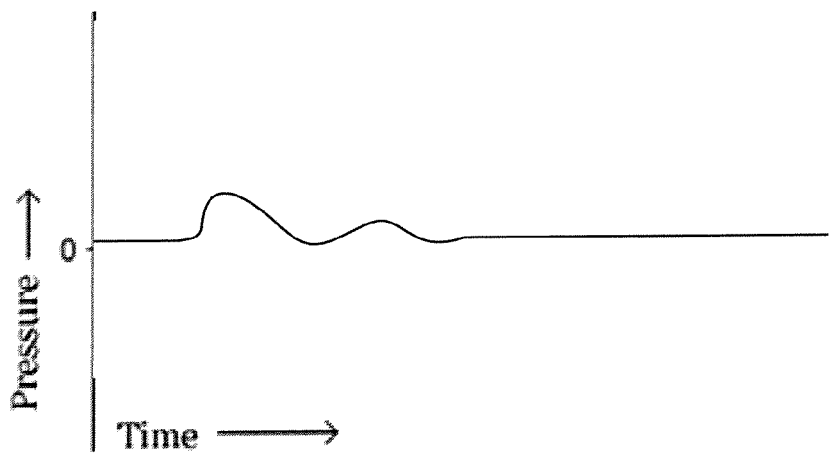
FIG. 4C illustrates a sound wave generated when a user taps a touch input region with a low impact tap, in accordance with one embodiment of the present invention.

Referring to FIGS. 4A-4C, these figures illustrate sound waves generated by a user tapping a touch input region, in accordance with embodiments of the present invention. Each of FIGS. 4A-4C are graphs of pressure verses time. The sound waves are picked up by the audio sensor 208 and converted into electrical audio signals representative of the sound waves.

FIG. 4A illustrates a sound wave generated when a user taps a touch input region with a high impact strength. FIG. 4B illustrates a sound wave generated when a user taps the touch input region with a medium impact strength. FIG. 4C illustrates a sound wave generated when a user taps the input region with a low impact strength. As illustrated, the harder the user taps the touch input region, the higher the amplitude of the sound wave. Additionally, stronger taps may generate sound waves that persist for a greater length of time.

Returning to FIG. 2A, audio analyzer 215 may include one or more impact strength thresholds that are used to identify taps and to identify impact strength of taps. If only two impact strengths are used, then audio analyzer 215 may include two impact strength thresholds. Audio signals below a lower threshold may be identified as non-tap gestures. Audio signals above the lower threshold but below an upper threshold may cause a low impact strength tap to be identified. Audio signals above the upper threshold may cause a high impact strength tap to be identified. If three impact strengths are used, there may be three thresholds, a lower threshold separating non-tap gestures from low impact taps, a middle threshold separating a low impact taps from a medium impact taps and an upper threshold separating the medium impact taps from high impact taps.

In one embodiment, audio analyzer 215 can identify the sound wave shown in FIG. 4A as having been generated by a hard (high impact) tap. Audio analyzer can also identify the sound wave shown in FIG. 4B as having been generated by an intermediate strength (medium impact) tap, and can identify the sound wave shown in FIG. 4C as having been generated by weak strength (low impact) tap. Alternatively, audio analyzer 215 may identify the sound waves shown in each of FIGS. 4A-4C as a basic user tap without identifying the impact strength.

A user touch having a particular impact strength may cause a different audio input signal to be generated depending on where in the touch input region the touch was placed. For example, an audio signal generated by a hard tap at a location that is distant from the audio sensor 208 may appear similar to an audio signal that is generated by a light tap close to the audio sensor 208. Accordingly, in one embodiment audio analyzer 215 receives position coordinate information from position identifier 210. Audio analyzer 215 may then attenuate, amplify or otherwise modify the audio input signal based on the received position coordinates.

Figure 2B:
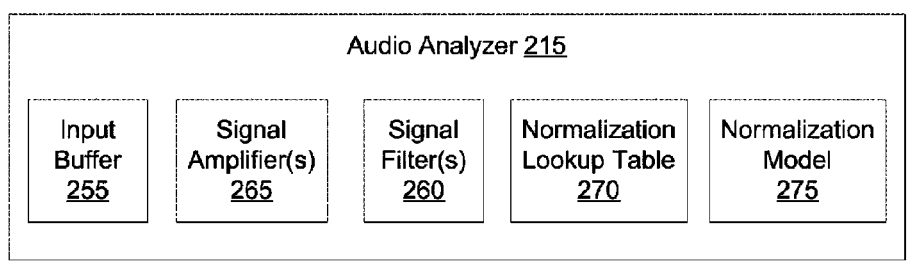
FIG. 2B illustrates a block diagram showing components of an audio analyzer, in accordance with one embodiment of the present invention.

FIG. 2B illustrates a block diagram showing components of the audio analyzer 215, in accordance with one embodiment of the present invention. In one embodiment, audio analyzer 215 includes a normalization lookup table 270 for modifying the audio input signal. Each entry in the lookup table 270 may include a single position coordinate or multiple position coordinates and an audio input modification value. The modification value may provide a specific amplification of the audio signal, attenuate the audio signal, or perform a more complex manipulation of the audio signal (e.g., amplifying and/or attenuating only a portion of the audio signal).

In another embodiment, audio analyzer 215 includes an audio signal normalization model 275. The normalization model 275 may include an algorithm or formula that takes as an input the position coordinates and generates as an output an amplification value. The audio analyzer 215 may use the normalization model 275 to modify the audio input signal based on the determined amplification value. The normalization model 275 may also be used to modify the audio input signal by changing a shape of the signal and/or attenuating the signal (e.g., based on the amplification value or other modification value).

In one embodiment, the normalization model 275 and/or normalization lookup table 270 are generated upon performing a factory calibration of the audio analyzer 275, which may include calibrating the audio sensor 208. Such calibration is discussed in greater detail below with reference to FIG. 11.

In one embodiment, audio analyzer 215 analyzes all received audio input signals for identification of user taps. In an alternative embodiment, audio analyzer 215 analyzes audio input signals upon receiving a notification from position identifier 210 that position sensor 202 has detected a user touch. In one embodiment, position identifier reports position coordinate information to audio analyzer 215.

In one embodiment, audio analyzer 215 includes an input buffer 255 that caches audio input signals. Therefore, if the audio input signal associated with a user tap is received by audio analyzer 215 before the position identifier 210 notifies audio analyzer 215 of a user touch, the audio input signal will not be discarded. In a further embodiment, audio analyzer 215 timestamps each received audio input signal as it is placed in the input buffer 255. When position identifier 210 notifies audio analyzer 215 that a user touch was detected, it may further report the time that the user touch was detected. Audio analyzer 215 may then retrieve an audio input signal from the input buffer 255 that is associated with a timestamp that matches the reported time.

Audio sensor 208 may pick up background noise that is generated at the same time that a user touch is detected by position sensor 202. In one embodiment, audio analyzer 215 includes one or more signal filters 260 that filter out the background noise before audio analyzer 215 analyzes the audio input signal. In one embodiment, one or more of the filters are bandpass filters that pass audio input signals having waveforms that are generated by user taps. In one embodiment, at least one filter 260 performs blind source separation or semi-blind source separation. Blind source separation separates a set of overlapping signals into distinct signals, such that the regularity of each distinct signal is maximized and the regularity between the distinct signals is minimized. Thus, filters implementing blind source separation can pass specific waveforms that are generated by user taps, while blocking other wave forms.

Audio analyzer 215 may also include one or more signal amplifiers 265 to amplify the audio input signal before and/or after it has been filtered. If the audio analyzer 215 is implemented in hardware, the amplifiers may be, for example, operational amplifiers (opamps). If the audio analyzer 215 is implemented in software, the amplifiers may be amplification algorithms.

Referring back to FIG. 2A, audio analyzer 215 reports identified user taps and/or impact strengths to controller 220. Controller 220 identifies user commands based on received position coordinates and received information on impact strength and/or user taps. If no data identifying a user tap is received from audio analyzer 215 (e.g., an impact strength that is below a threshold is determined), controller 220 may generate position commands for moving a cursor. If a tap is identified by the audio analyzer (e.g., an impact strength above a threshold is determined), controller 220 may generate one or more execution, selection or other commands.

Different impact strengths may be associated with different commands. For example, a low impact strength may be associated with a first command, a medium impact strength may be associated with a second command, and a high impact strength may be associated with a third command. In one embodiment, the strength of impact associated with a user tap is used to determine what command or commands to generate. In one embodiment, in which controller 220 receives impact strength information from both position identifier 210 and from audio analyzer 215, controller 220 resolves any discrepancies between the two reported impact strengths before generating the commands. This is discussed in greater detail below with reference to FIG. 7.

Controller 220 may generate an output signal that includes the generated command or commands, and send the output signal to the host computing device. The host computing device may then perform one or more actions based on the received commands.

The electronic device 205 may interface with the host computing device through a variety of methods. In one exemplary embodiment, electronic device 205 is connected with the host computing device via a standard PS/2 interface. In another exemplary embodiment, electronic device 205 connected to the host computing device via a universal serial bus (USB) interface. Alternatively, electronic device 205 may connect with the host computing device via other industry standard interfaces, such as an inter-integrated circuit (I2C) bus, system packet interface (SPI), RS-232 serial, or Bluetooth.

The position identifier 210, audio analyzer 215 and controller 220 may be discrete components (e.g., integrated circuits) or software components (e.g., software modules). Alternatively, the position identifier 210, audio analyzer 215 and controller 220 may be components of a single hardware or software device. In one embodiment, each of the position identifier 210, audio analyzer 215 and controller 220 are separate active electronic components. Alternatively, the position identifier 210, audio analyzer 215 and/or controller 220 may be logics that are part of a single active electronic component (e.g., an integrated circuit or multi-chip module) that is capable of performing the functions of each included logic. The active electronic component may be a microprocessor or central processing unit, a controller, special-purpose processor, general purpose processor, digital signal processor (DSP), an application specific integrated circuit (ASIC), a field programmable gate array (FPGA), or the like. The logics may be hardware logics or software logics.

Note that though a single audio sensor (e.g., microphone) has been described with reference to FIGS. 1A-2A, the computing devices and/or electronic device may also include multiple audio sensors. If multiple audio sensors are used, electric device 205 may include multiple audio analyzers that separately compute touch impact strength based on audio signals received from different audio sensors. Alternatively, audio analyzer 215 may determine a touch impact strength based on audio signals received from multiple audio sensors.

Figure 5:
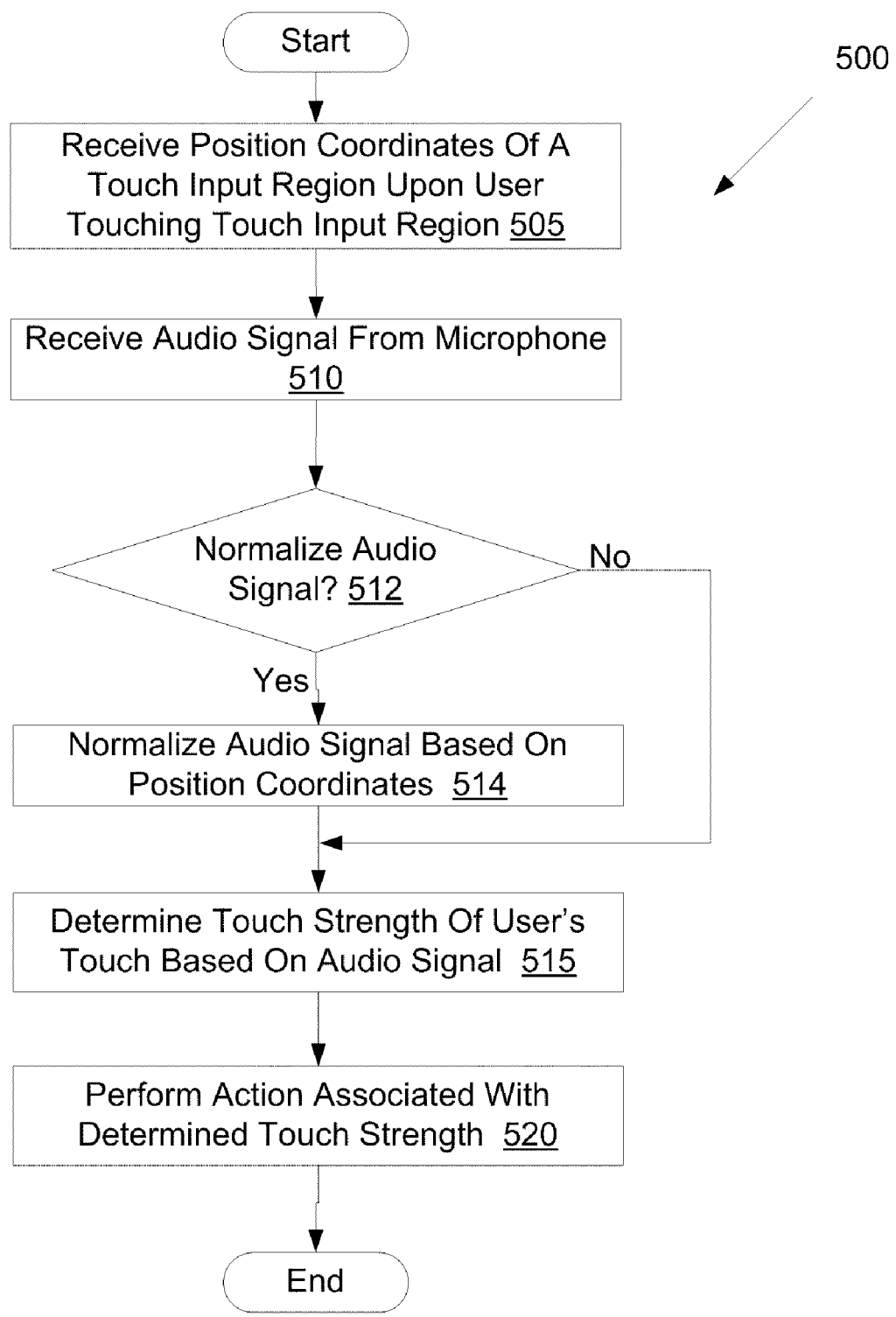
FIG. 5 illustrates a flow diagram of one embodiment for a method of detecting user taps in a touch input region.

FIG. 5 illustrates a flow diagram of one embodiment for a method 500 of detecting user taps in a touch input region. The method may be performed by processing logic that may comprise hardware (e.g., circuitry, dedicated logic, programmable logic, microcode), software (such as instructions run on a processing device), firmware, or a combination thereof. In one embodiment, method 500 is performed by the electronic device 205 of FIG. 2A.

Referring to FIG. 5, at block 505 of method 500 the initial presence of a conductive object is detected. Position coordinates of a touch input region are determined upon the user touching the touch input region. At block 510, an audio signal is received from an audio sensor.

At block 512, processing logic determines whether to normalize the audio signal. In one embodiment, the audio signal is normalized using a normalization model or lookup table based on the position coordinates. If the received position coordinates correspond to a location that generates audio signals that should be normalized, the method proceeds to block 514. If the received position coordinates do not correspond to such a location, or if the processing logic is not configured to perform normalization, the method proceeds to block 515.

At block 515, processing logic determines an impact strength of a user's touch based on the audio signal. If the audio signal has been normalized, then the impact strength of the user's touch is determined based on the normalized audio signal. At block 520, processing logic generates a command or commands associated with the determined impact strength. The method then ends.

Figure 6:
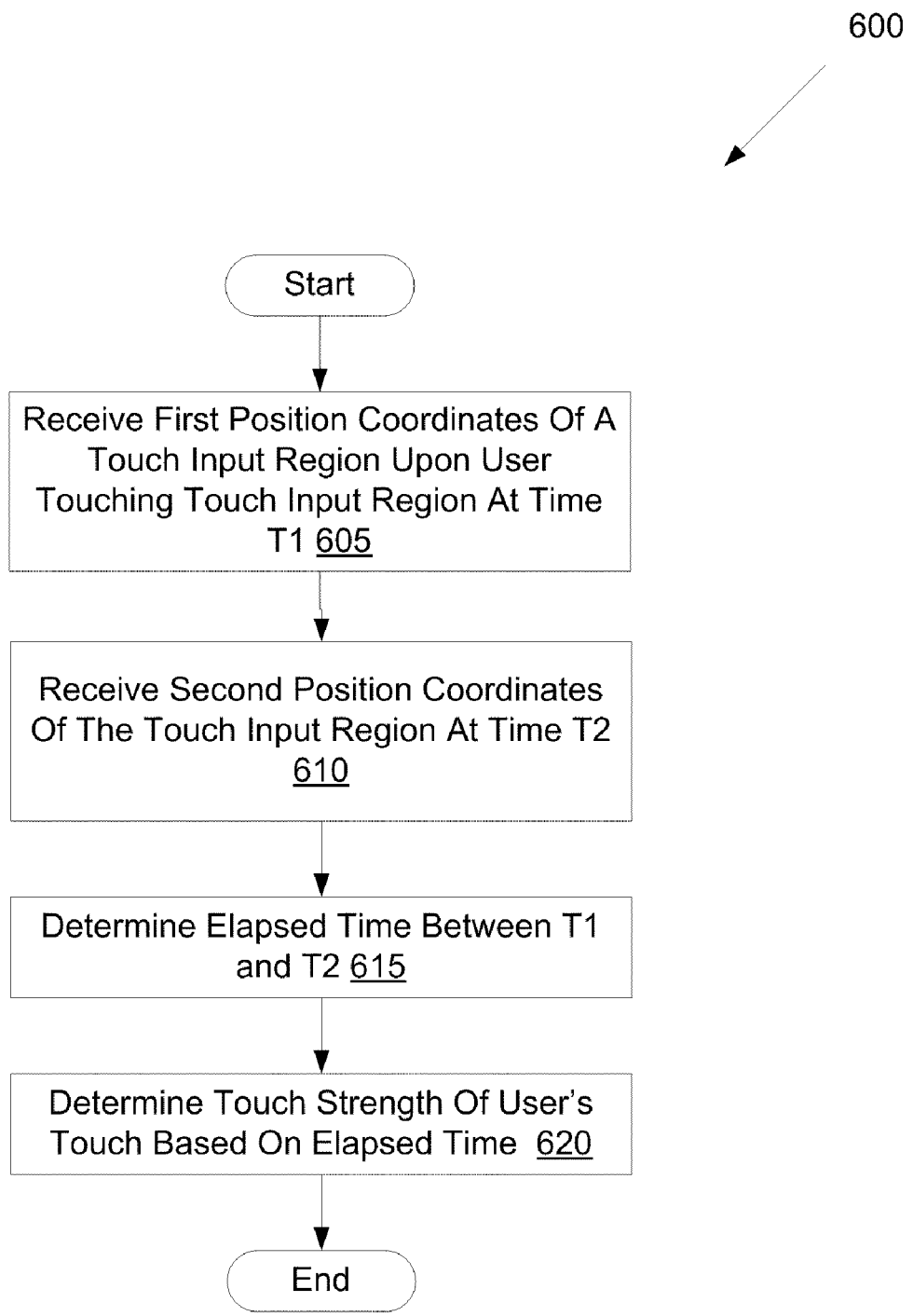
FIG. 6 illustrates a flow diagram of another embodiment for a method of detecting user taps in a touch input region.

FIG. 6 illustrates a flow diagram of another embodiment for a method 600 of detecting user taps in a touch input region. The method may be performed by processing logic that may comprise hardware (e.g., circuitry, dedicated logic, programmable logic, microcode), software (such as instructions run on a processing device), firmware, or a combination thereof. In one embodiment, method 600 is performed by the electronic device 205 of FIG. 2A.

Referring to FIG. 6, at block 605 of method 600 position coordinates of a touch input region are determined upon a user initially touching the touch input region at a time T1. The user's initial touch may be from the tip of a user's finger, and may show up as a small circle in the touch input region. In one embodiment, the first position coordinates meet a first (lower) contact threshold. The first contact threshold in one embodiment is satisfied when an object having a first size and/or shape corresponding to the size and/or shape of the tip of a user's finger is detected.

At block 610, second position coordinates of the touch input region are received at a time T2 upon the user fully pressing the finger onto the touch input region. The user's full touch may be from some portion of the finger that is greater than merely the tip, and may show up as a larger circle or an oval. In one embodiment, the second position coordinates meet a second (upper) contact threshold. The second contact threshold in one embodiment is satisfied when an object having a second size and/or shape corresponding to the size and/or shape of the user fully pressing a finger onto the touch input region is detected.

At block 615, processing logic determines an amount of time that has elapsed between time T1 and time T2. In one embodiment, the elapsed time is on the scale of fractions of a second. For example, the delta between T1 and T2 may be on the order of microseconds.

At block 620, processing logic determines an impact strength for the user's touch (or tap) based on the elapsed time. Shorter elapsed times may identify higher impact strength and longer elapsed times may identify lower impact strength.

Figure 7:
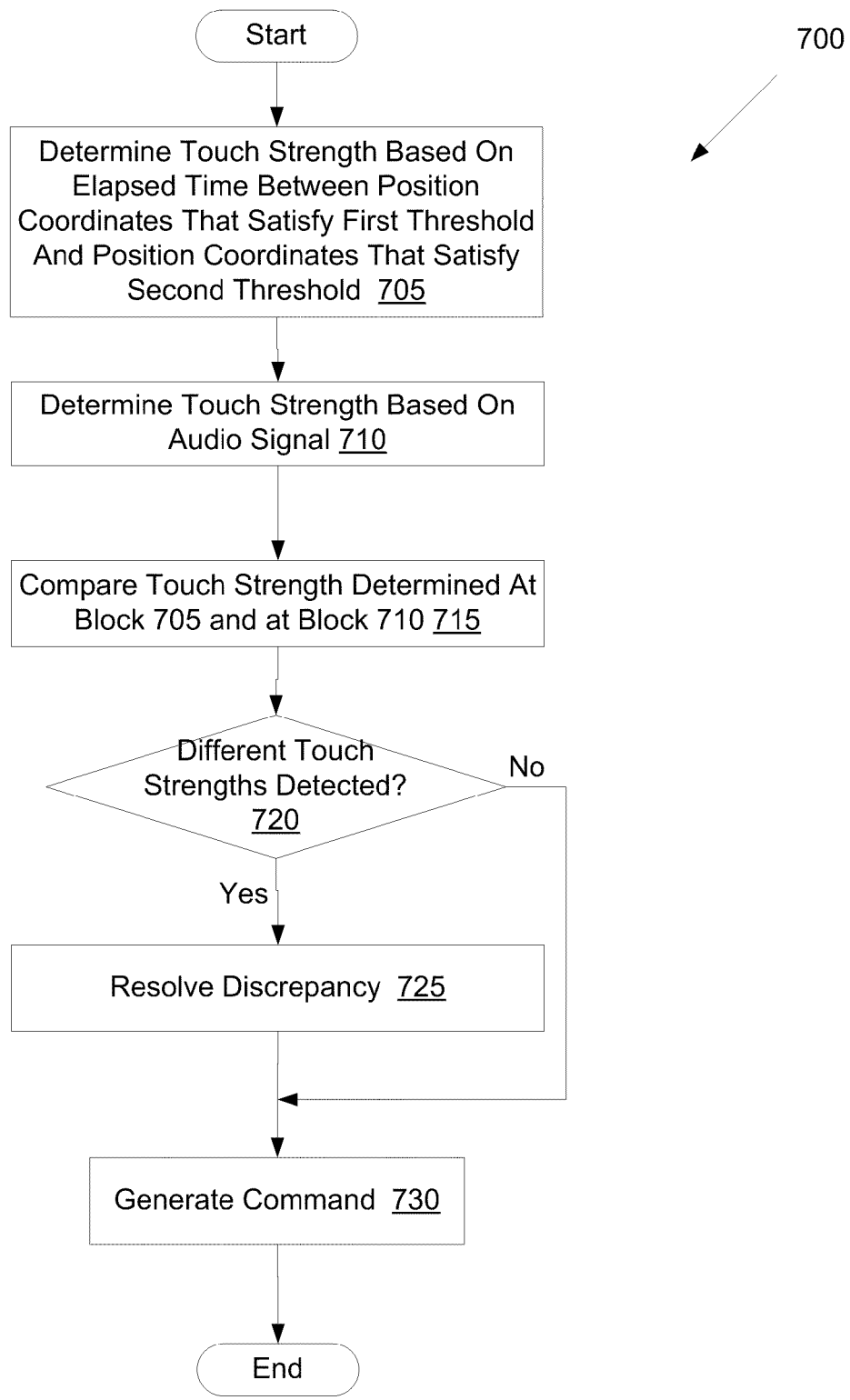
FIG. 7 illustrates a flow diagram of another yet embodiment for a method of detecting user taps in a touch input region.

FIG. 7 illustrates a flow diagram of another yet embodiment for a method 700 of detecting user taps in a touch input region. The method may be performed by processing logic that may comprise hardware (e.g., circuitry, dedicated logic, programmable logic, microcode), software (such as instructions run on a processing device), firmware, or a combination thereof. In one embodiment, method 700 is performed by the electronic device 205 of FIG. 2A.

Referring to FIG. 7, at block 705 of method 700 and impact strength of a user's touch is determined based on an elapsed time between position coordinates that satisfy a first contact threshold and position coordinates that satisfy a second contact threshold. In one embodiment, method 600 is performed to make such a determination. If a determined time interval is below an impact strength threshold, a first impact strength may be determined, while if the time interval is above the threshold, a second impact strength can be determined.

At block 710, an impact strength the user's touch is determined based on an audio signal that corresponds to a sound wave generated when the touch input region was touched. In one embodiment, method 500 is performed to make such a determination. If an audio signal is above an impact strength threshold, a first impact strength may be determined, while if the audio signal is below the threshold a second impact strength may be determined.

At block 715, the impact strength determined at block 705 is compared to the impact strength determined at block 710. Ideally, the two impact strengths will be the same since they are both measuring the same touch. However, calibration between components may be off, which may cause the determined impact strengths to have different values.

At block 720, processing logic determines whether different impact strengths have been detected. If different impact strengths have been detected, the method proceeds to block 725. If the same impact strength has been detected, the method proceeds to block 730.

At block 725, processing logic resolves the discrepancy between the determined impact strengths. The discrepancy may be resolved in a number of ways. In one embodiment, the discrepancies are resolved by using the impact strength determined at block 705. Alternatively, discrepancies may be resolved by using the impact strength determined at block 710. In another embodiment, the signals that caused the impact strengths to be determined are reviewed.

In one embodiment, the discrepancy is resolved by discarding the touch impact strength that was closest to an impact strength threshold. For example, assume that the time interval determined at block 705 far exceeded the time interval included in an impact strength threshold, while the audio signal received at block 710 was very close to the audio signal included an impact strength threshold. Under these circumstances, the impact strength determined at block 705 would be used.

In one embodiment, a confidence rating is generated for each impact strength calculation. The impact strength having the highest confidence rating (smallest margin of error) may be determined to be the correct impact strength.

At block 730, a command or commands associated with the impact strength are generated. The commands may be sent to a host computing device, which may interpret the commands to perform one or more actions. What action or actions are performed may depend on active applications, where a cursor is positioned when the command is received, and other factors. The method then ends.

The audio signal that is generated by a tap may vary depending on where in the touch input region that tap is made. This variance may depend on where the microphone is located with relation to the touch input region, coupling of the touch input region and the microphone to a chassis, materials used for the device, reverberation, etc. To ensure consistent results, it may be beneficial therefore to calibrate the electronic device including the touch input region.

Figure 8A:
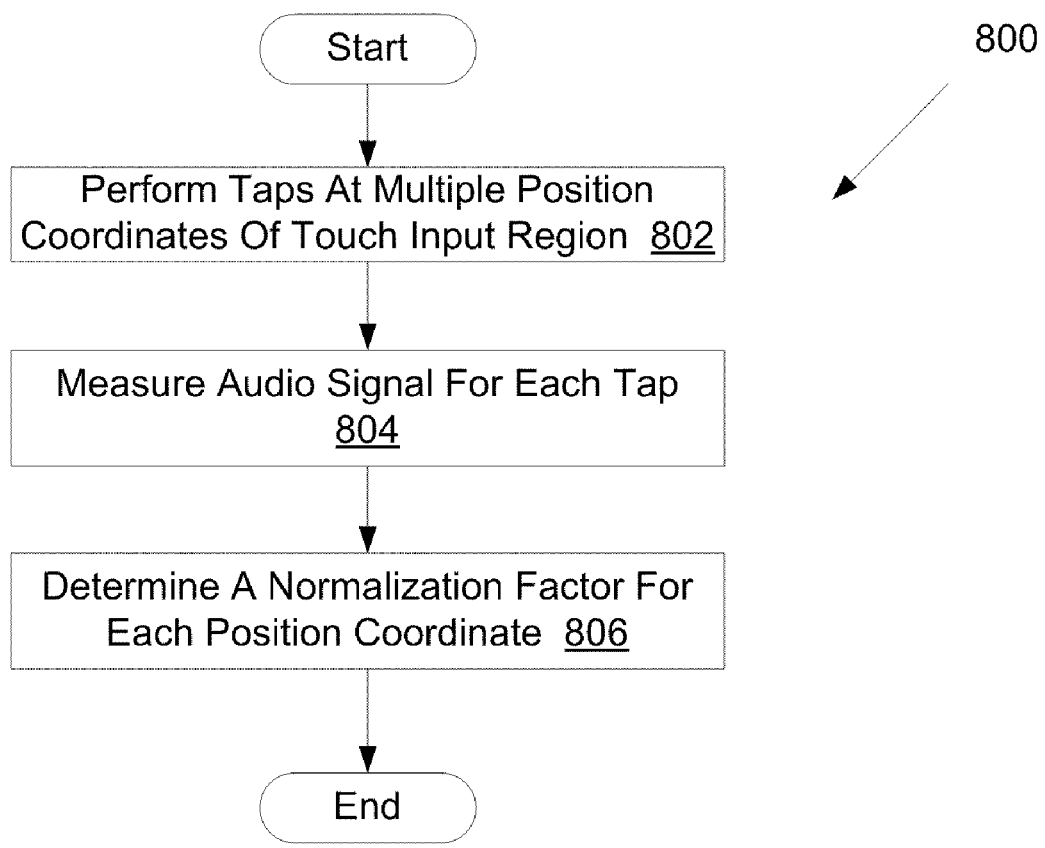
FIG. 8A illustrates a flow diagram of one embodiment for a method of performing a factory calibration of an audio analyzer and/or audio sensor.

FIG. 8A illustrates a flow diagram of one embodiment for a method 800 of performing a factory calibration of an audio analyzer and/or audio sensor. The method may be performed by processing logic that may comprise hardware (e.g., circuitry, dedicated logic, programmable logic, microcode), software (such as instructions run on a processing device), firmware, or a combination thereof. In one embodiment, method 800 is performed by the electronic device 205 of FIG. 2A. Method 800 may be performed by a device manufacturer before the device is shipped to a customer.

Referring to FIG. 8A, at block 805 of method 800 taps are performed at multiple position coordinates of a touch input region. Each tap preferably has the same touch strength. In one embodiment, the taps are performed by a machine. This may ensure that the same tap strength is used for each tap, and that particular regions of the touch input region are tapped. At block 810, the audio signal is measured for each tap. Since taps having the same strength are used, the audio signals may be used to identify how each location affects the audio input signal. For example, the audio signals may be used to identify dampening patterns across the touch input region.

At block 815, a normalization value or factor is determined for each position coordinate. In one embodiment, position coordinates are divided into attenuation zones. Audio signals generated by taps in particular position coordinates can then be normalized based on the associated attenuation zone. Alternatively, each position coordinate is assigned an independent normalization value. Each normalization value identifies how audio signals that are originated from the associated position coordinates should be modified to correct for attenuation. The normalization values may then be used to either attenuate or boost an audio input signal responsive to position.

Figure 8B:
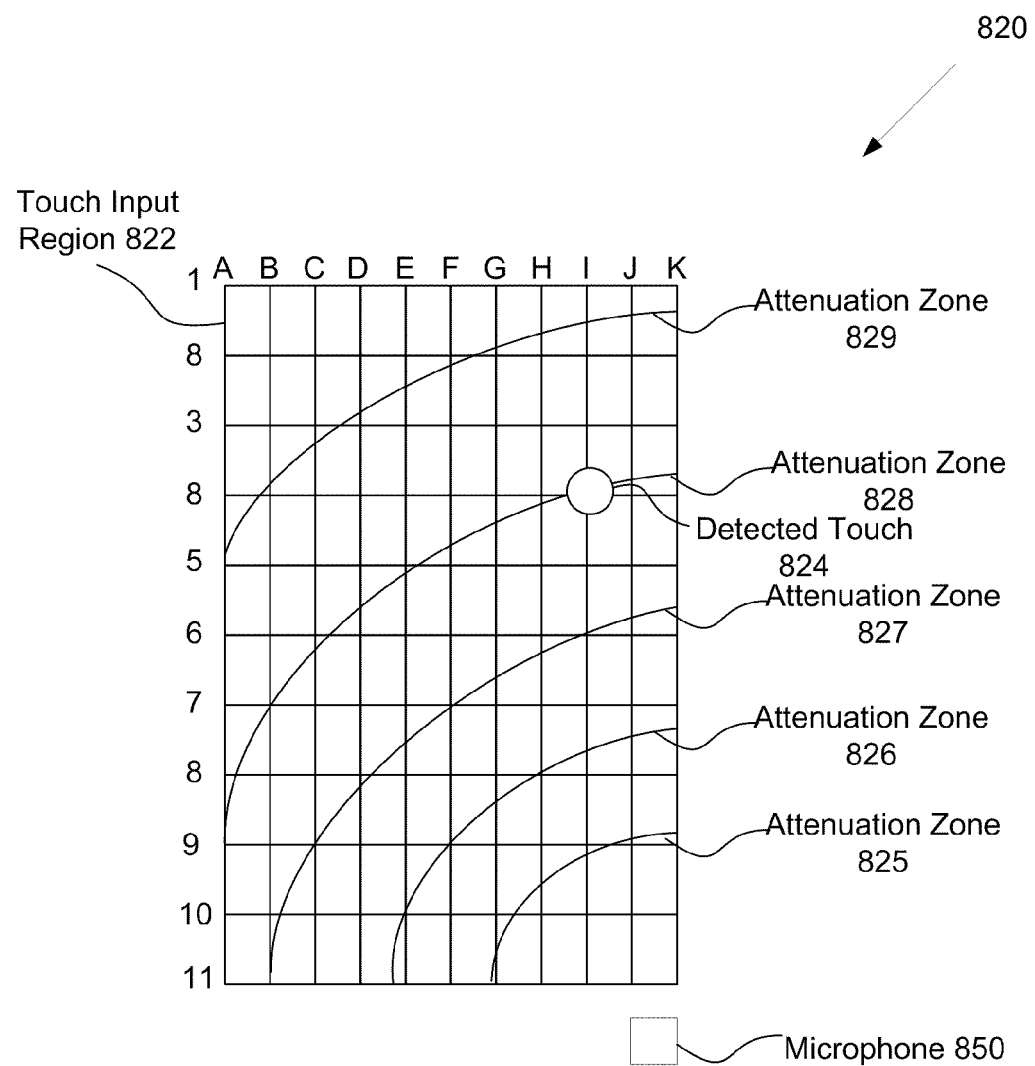
FIG. 8B illustrates the example touch input region shown in FIG. 3A, with the inclusion of attenuation zones, in accordance with one embodiment of the present invention.

FIG. 8B illustrates the example touch input region 822 shown in FIG. 3A, with the inclusion of attenuation zones 825-829. User taps having the same impact strength may cause different audio signals to be generated depending on where in the touch input region 822 the user taps are placed. For example, a high impact user tap at coordinates B4 may cause a different audio input signal than the same high impact user tap at coordinates E10. Accordingly, in one embodiment, the touch input region 822 is divided into different attenuation zones 825-829. An audio input signal may be amplified, attenuated, or otherwise modified based upon the attenuation zone in which the user touch 824 was detected. For example, audio signals generated by a user tap in attenuation zone 825 may remain unmodified, while audio signals generated by a user tap in attenuation zone 826 may be slightly amplified. In one embodiment, the further an attenuation zone is from a microphone 850, the stronger the audio input signal is amplified. For example, an audio signal associated with detected touch 824 at coordinates 4I may be moderately amplified.

How users interact with a touch input region may vary from user to user. For example, one user's soft tap may correspond to another user's hard tap. Accordingly, it may be beneficial to calibrate touch input regions for individual users. This user calibration may be performed in addition to the factory calibration described with reference to FIG. 8A.

Figure 9:
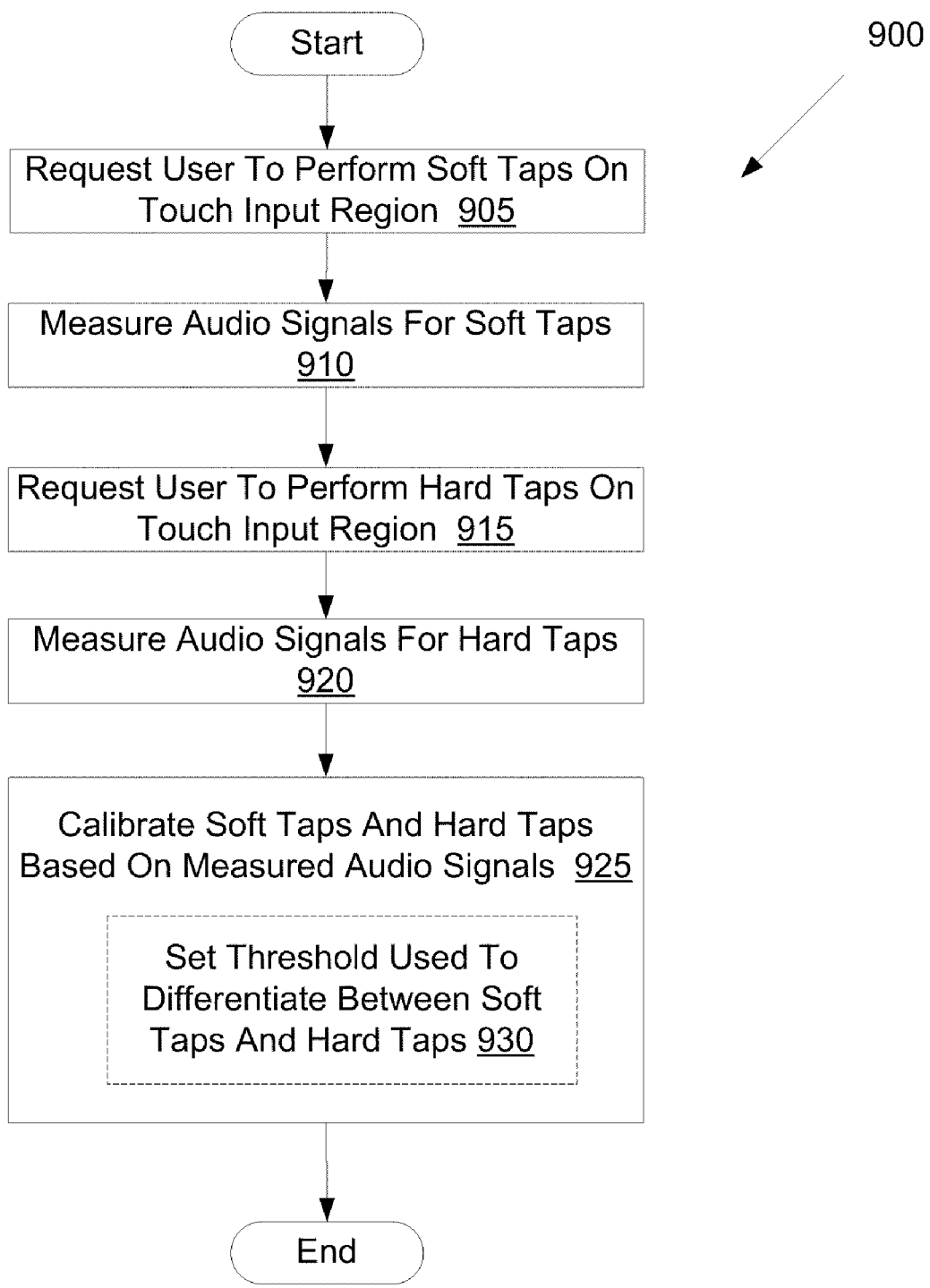
FIG. 9 illustrates a flow diagram of one embodiment for a method of performing user calibration.

FIG. 9 illustrates a flow diagram of one embodiment for a method 900 of calibrating an audio analyzer and/or audio sensor for a user (performing user calibration). The method may be performed by processing logic that may comprise hardware (e.g., circuitry, dedicated logic, programmable logic, microcode), software (such as instructions run on a processing device), firmware, or a combination thereof. In one embodiment, method 900 is performed by the electronic device 205 of FIG. 2A.

Referring to FIG. 9, at block 905 of method 900 a user is requested to perform soft taps on the touch input region. The user may be requested to perform a fixed number of soft taps (e.g., at least 5 soft taps). The more soft taps that the user performs, the more statistically significant the soft tap data may be. In one embodiment, the user is requested to tap any portion of the touch input region. In another embodiment, the user is requested to tap one or more specific locations of the touch input region. At block 910, audio signals are measured for the soft taps.

At block 915, the user is requested to perform hard taps on the touch input region. At block 920, audio signals are measured for the hard taps.

At block 925, the soft taps and hard taps are calibrated based on the measured audio signals. In one embodiment, as shown in block 930, a threshold that is used to differentiate between soft taps and hard taps for the user is set during calibration. The threshold may be an audio signal threshold or a threshold of time between initial contact and full touch. Thus, if the user taps the touch input region to generate an audio input signal that is below the threshold, a soft tap may be recognized, and if the user taps the touch input region to generate an audio signal that is above the threshold, a hard tap may be recognized.

Note that method 900 may also be used to calibrate other impact strengths, such as a medium impact strength. In such an embodiment, the user may be asked to perform medium impact strength taps. Processing logic may then determine two thresholds, one separating the low and medium impact strengths, and another separating the medium and high impact strengths.

Figure 10:
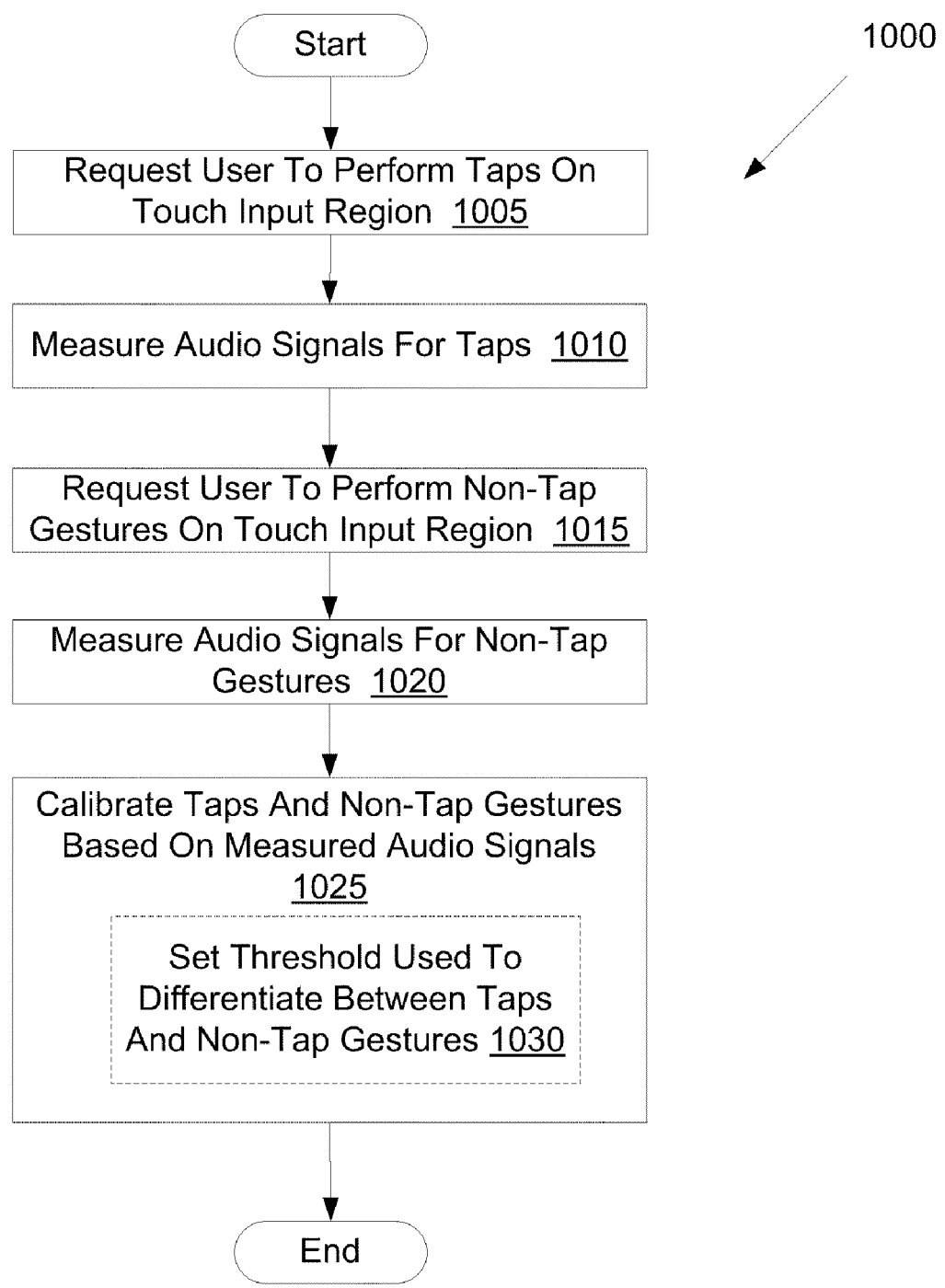
FIG. 10 illustrates a flow diagram of another embodiment for a method of performing user calibration.

FIG. 10 illustrates a flow diagram of another embodiment for a method 1000 of calibrating an audio analyzer and/or audio sensor for a user (performing user calibration). The method may be performed by processing logic that may comprise hardware (e.g., circuitry, dedicated logic, programmable logic, microcode), software (such as instructions run on a processing device), firmware, or a combination thereof. In one embodiment, method 1000 is performed by the electronic device 205 of FIG. 2A.

Referring to FIG. 10, at block 1005 of method 1000 a user is requested to perform taps on the touch input region. The user may be requested to perform taps of various strengths, such as soft taps, medium taps and hard taps. At block 1010, audio signals are measured for the taps.

At block 1015, the user is requested to perform non-tap gestures on the touch input region. Non-tap gestures may include sliding a finger across the touch input region, softly touching the touch input region, ambient handling of the touch input region, gentle picking up and replacing of a finger on the touch input region, etc. At block 1020, the processing logic measures the audio signals generated for the non-tap gestures.

At block 1025, the processing logic calibrates the taps and non-tap gestures based on the measured audio signals. In one embodiment, shown in block 1030, this includes setting a threshold that is used to differentiate between taps and non-tap gestures. Once the threshold is set, when a user touch is detected, it is not recognized as a tap if the audio signal associated with the touch is below the threshold. This may prevent taps from being mistakenly identified when a user had no intention of tapping the touch input region. For example, after calibration an accidental picking up and replacing of a finger may be differentiated from a deliberate tap in the touch input region.

Figure 11:
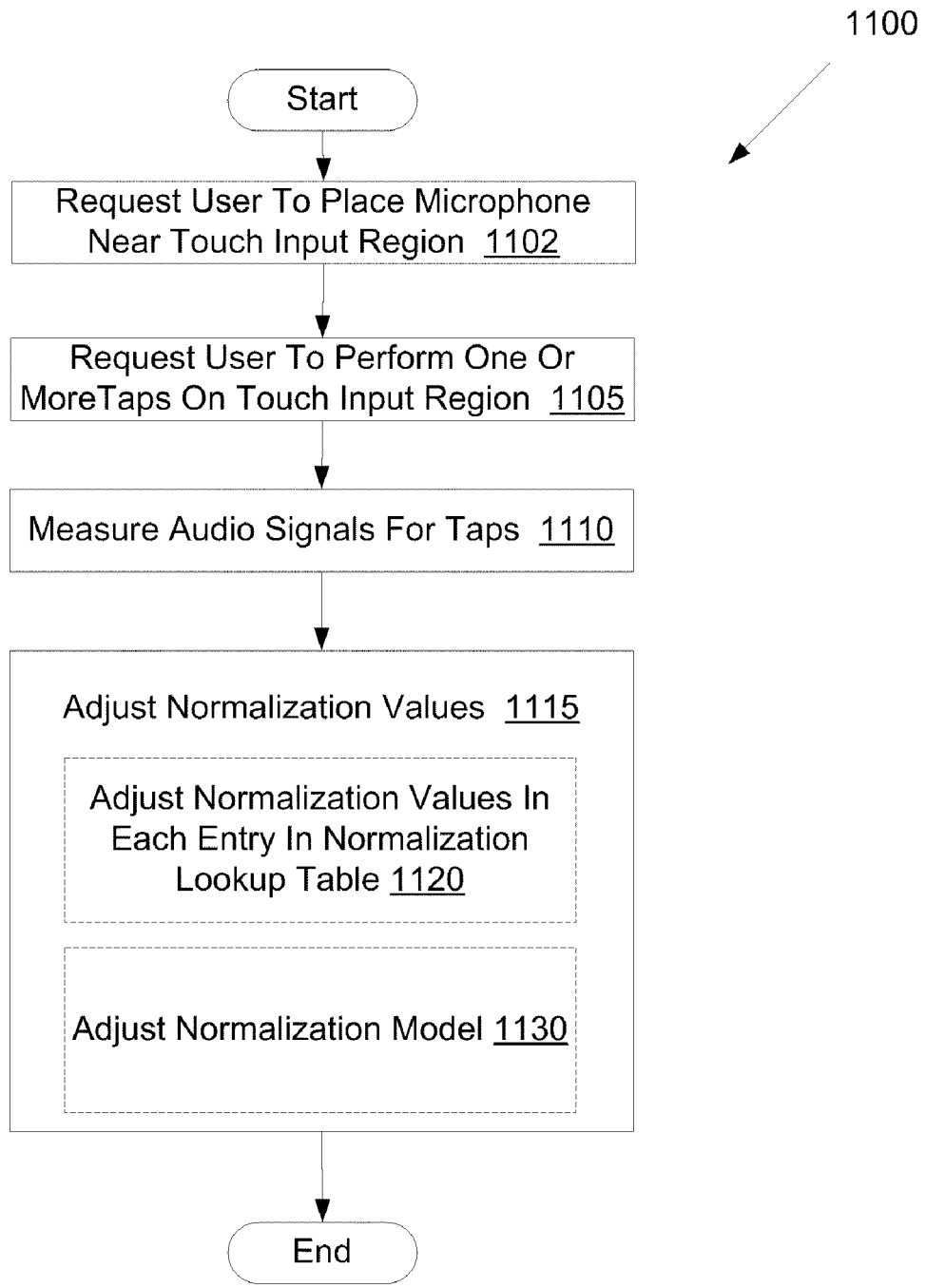
FIG. 11 illustrates a flow diagram of one embodiment for a method of calibrating an audio analyzer and/or audio sensor for use with a touch input region of a camera/projector.

FIG. 11 illustrates a flow diagram of one embodiment for a method 1100 of calibrating an audio analyzer and/or audio sensor for use with a touch input region of a camera/projector. The method may be performed by processing logic that may comprise hardware (e.g., circuitry, dedicated logic, programmable logic, microcode), software (such as instructions run on a processing device), firmware, or a combination thereof. In one embodiment, method 1100 is performed by the electronic device 205 of FIG. 2A.

Referring to FIG. 11, at block 1102 of method 1100 a user is requested to place an audio sensor (e.g., microphone) near a touch input region. At block 1105 the user is requested to perform one or more taps on the touch input region. The user may be requested to perform the taps at a specific location or locations of the touch input region. The user may be requested to perform taps of various strengths, such as soft taps, medium taps and hard taps. At block 1110, audio signals are measured for the taps.

At block 1115, processing logic adjusts normalization values that will be used for user taps at different locations of the touch input region. In one embodiment, at block 1120 processing logic adjusts normalization values associated with attenuation zones and/or associated with individual position coordinates in a normalization lookup table. In one embodiment, at block 1130 processing logic adjusts a normalization model based on the measured audio signals and positions of the taps. Once the normalization values are adjusted, the same impact strength will be determined for a given user touch regardless of where in the touch input region the touch is placed.

Figure 12:
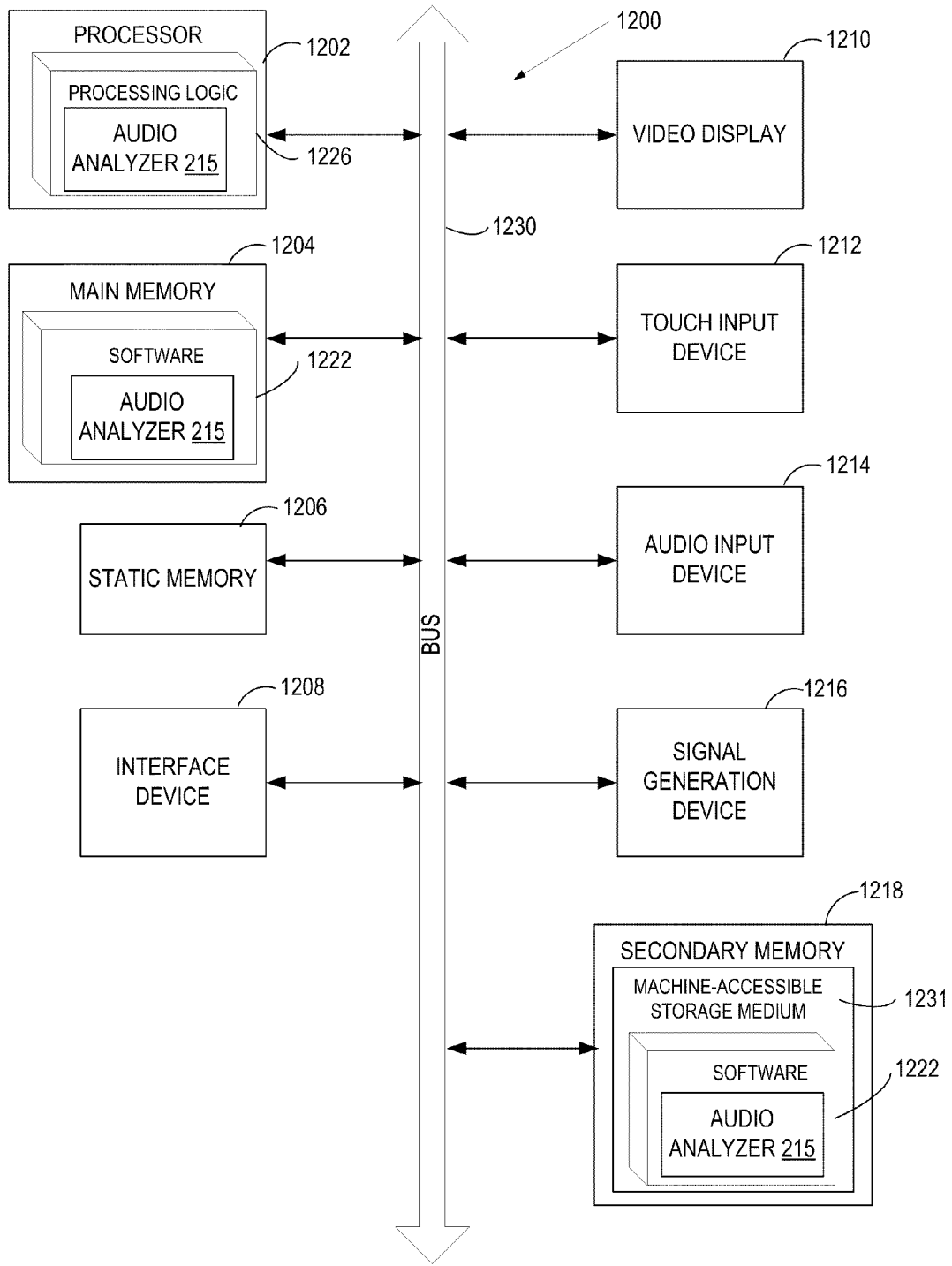
FIG. 12 illustrates a diagrammatic representation of a machine in the exemplary form of a computer system, for causing the machine to perform any one or more of the methodologies discussed herein.

FIG. 12 illustrates a diagrammatic representation of a machine in the exemplary form of a computer system 1200 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), portable game console, Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1200 includes a processor 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a secondary memory 1218 (e.g., a data storage device), which communicate with each other via a bus 1230.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1202 may also be one or more special-purpose processing devices such as an application specific integrated circuit (ASIC), a field programmable gate array (FPGA), a digital signal processor (DSP), network processor, or the like. Processor 1202 is configured to execute the processing logic 1226 for performing the operations and steps discussed herein.

The computer system 1200 may further include an interface device 1208, which may be a wireless interface device or wired interface device. The computer system 1200 also may include a video display unit 1210 (e.g., a liquid crystal display (LCD) or a cathode ray tube (CRT)), a touch input device 1212 (e.g., a touchpad, touchscreen, projection keyboard, etc.), an audio input device 1214 (e.g., a microphone) and a signal generation device 1216 (e.g., a speaker).

The secondary memory 1218 may include a machine-readable storage medium (or more specifically a computer-readable storage medium) 1231 on which is stored one or more sets of instructions (e.g., software 1222) embodying any one or more of the methodologies or functions described herein. The software 1222 may also reside, completely or at least partially, within the main memory 1204 and/or within the processing device 1202 during execution thereof by the computer system 1200, the main memory 1204 and the processor 1202 also constituting machine-readable storage media.

The machine-readable storage medium 1231 may be used to store a position identifier 210, audio analyzer 215 and/or controller 220 (as described with reference to FIG. 2A) and/or a software library containing methods that call a position identifier 210, audio analyzer 215 and/or controller. While the machine-readable storage medium 1231 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

When implemented in software, the position identifier 210, audio analyzer 215 and/or controller 220 (as described with reference to FIG. 2A) may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method of responding to touch based user input, comprising:
   determining position coordinates of a touch input region upon a user touching the touch input region;
   receiving an audio signal from a microphone upon the user touching the touch input region;
   determining an impact strength of the user's touch based on the audio signal; and
   generating a first command that is associated with the determined impact strength if the determined impact strength exceeds a first threshold, and generating a second command, different than the first command, that is associated with the determined impact strength if the determined impact strength exceeds a second threshold, wherein a host computing device performs a first action based on the generated first command and performs a second action based on the generated second command.

2. The method of claim 1, wherein a low impact strength is associated with ambient handling of the touch input region and a high impact strength is associated with a deliberate user tap.

3. The method of claim 1, further comprising:
   normalizing the audio signal based on the position coordinates.

4. The method of claim 1, further comprising:
   calibrating the microphone by performing a plurality of taps on the touch input region, each of the plurality of taps occurring at different position coordinates of the touch input region and having an approximately identical impact strength;
   measuring the audio signal for each of the plurality of taps; and
   normalizing the measured audio signals for the plurality of taps such that they each have approximately the same reading.

5. The method of claim 1, further comprising:
   requesting a user to perform one or more soft taps on the touch input region;
   measuring audio signals for the one or more soft taps;
   requesting the user to perform on or more hard taps on the touch input region;
   measuring audio signals for the one or more hard taps; and
   setting the first threshold and the second threshold to differentiate between the hard taps and the soft taps based on the measured audio signals for the hard taps and the measured audio signals for the soft taps.

6. The method of claim 1, further comprising:
   requesting the user to perform one or more non-tap gestures on the touch input region;
   measuring the audio signal received during performance of the one or more non-tap gestures; and
   setting the first threshold to differentiate between deliberate user taps and non-tap gestures.

7. An electronic apparatus, comprising:
   a position identifier to identify position coordinates corresponding to a location of a touch input region touched by a user;
   an audio analyzer to receive an audio signal generated by an audio sensor when the touch input region is touched by the user and to determine an impact strength of the user's touch based on the audio signal; and
   a controller to receive the position coordinates from the position identifier and the impact strength from the audio analyzer, and to generate a first command that is associated with the determined impact strength if the determined impact strength exceeds a first threshold, and generating a second command, different than the first command, that is associated with the determined impact strength if the determined impact strength exceeds a second threshold, wherein a host computing device to perform a first action based on the generated first command and perform a second action based on the generated second command.

8. The electronic apparatus of claim 7, further comprising:
   at least one of a touchpad or a touchscreen that includes the touch input region, wherein the at least one of the touchpad or the touchscreen to send a position signal to the position identifier when the user touches the touch input region.

9. The electronic apparatus of claim 7, further comprising:
   a camera that is configured to perform video tracking within the touch input region, wherein the camera to send a position signal to the position identifier when the user touches the touch input region.

10. The electronic apparatus of claim 7, further comprising:
    the audio sensor, wherein the audio sensor is wirelessly connected with at least one of the host computing device or a wireless interface of the electronic apparatus.

11. The electronic apparatus of claim 7, wherein a low impact strength is associated with ambient handling of the touch input region and a high impact strength is associated with a deliberate user tap.

12. The electronic apparatus of claim 7, further comprising:
    a display to display a first request for a user to perform one or more soft taps on the touch input region and to display a second request for the user to perform one or more hard taps on the touch input screen;

the audio analyzer to receive audio signals for the one or more soft taps and for the one or more hard taps, and to set the first threshold and the second threshold to differentiate between the hard taps and the soft taps based on the received audio signals for the hard taps and the received audio signals for the soft taps.

13. The electronic apparatus of claim 7, further comprising:
the audio analyzer to receive first audio signals that are known to be caused by non-tap gestures on the touch input region, to receive second audio signals that are known to be caused by deliberate user taps on the touch input region, and to set the first threshold to differentiate between deliberate user taps and non-tap gestures.

14. The electronic apparatus of claim 7, wherein the audio analyzer maintains a lookup table that associates a normalization value with each set of position coordinates, the audio analyzer to receive the position coordinates from the position identifier and to modify the received audio signal based on the normalization value associated with the received position coordinates.

15. The electronic apparatus of claim 7, wherein the audio analyzer includes a normalization model that uses as an input the position coordinates and generates as an output an amplification value, the audio analyzer to receive the position coordinates from the position identifier, to determine the amplification value using the model, and to modify the received audio signal based on the amplification value.

* * * * *